Nov. 15, 1966  W. L. SCHNEIDER ETAL  3,285,075
GAS PUMP APPARATUS AND GYROSCOPE SYSTEM EMPLOYING SAME
Filed Feb. 28, 1964  2 Sheets-Sheet 1
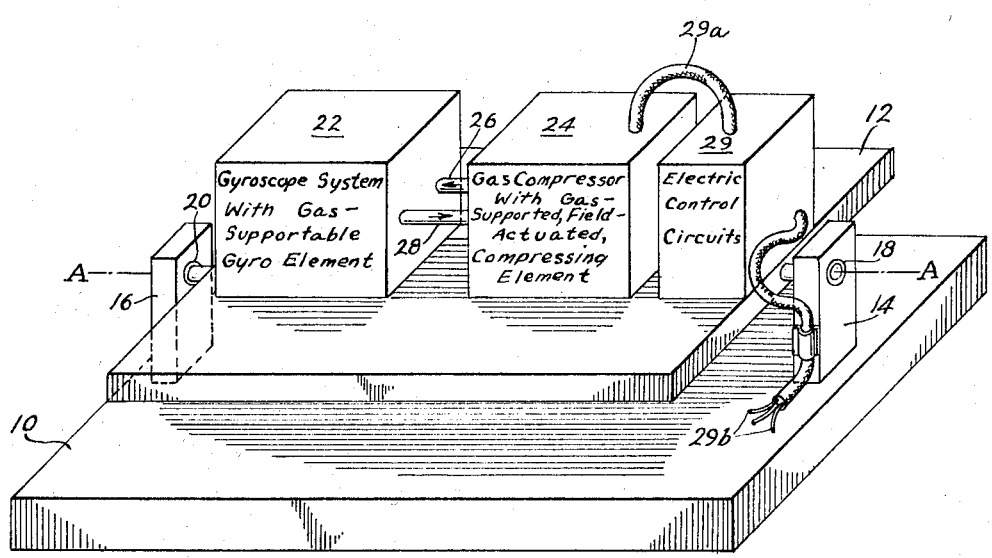
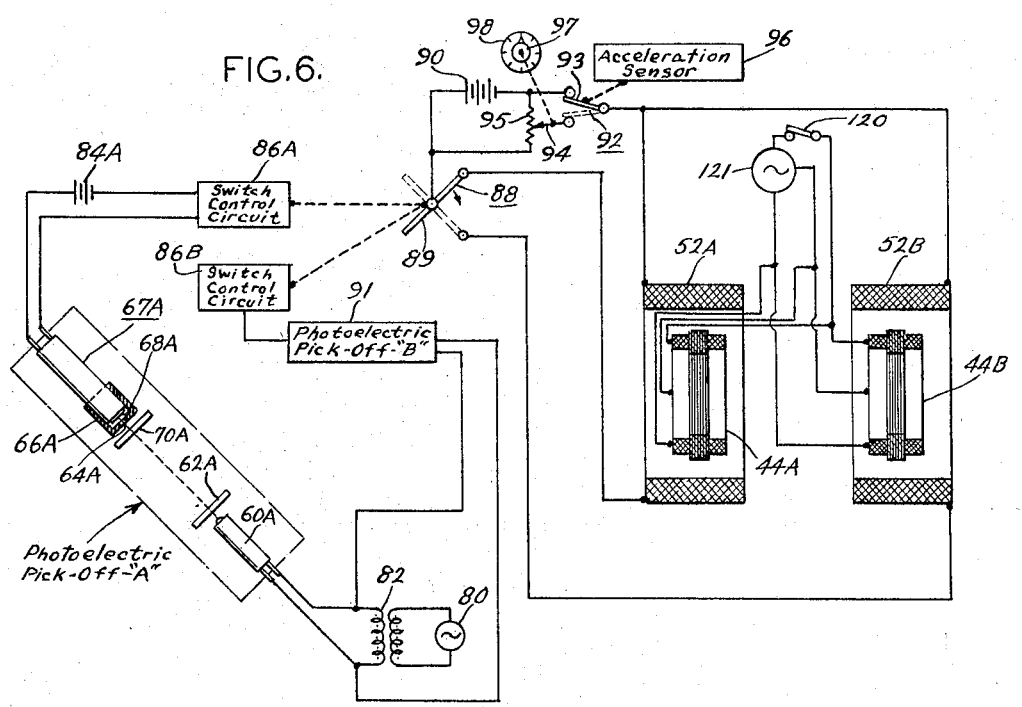
INVENTORS
WALTER L. SCHNEIDER
DOMINICK P. SCOTTO
BY
Howson & Howson
ATTYS Nov. 15, 1966 W. L. SCHNEIDER ETAL 3,285,075
GAS PUMP APPARATUS AND GYROSCOPE SYSTEM EMPLOYING SAME
Filed Feb. 28, 1964 2 Sheets-Sheet 2
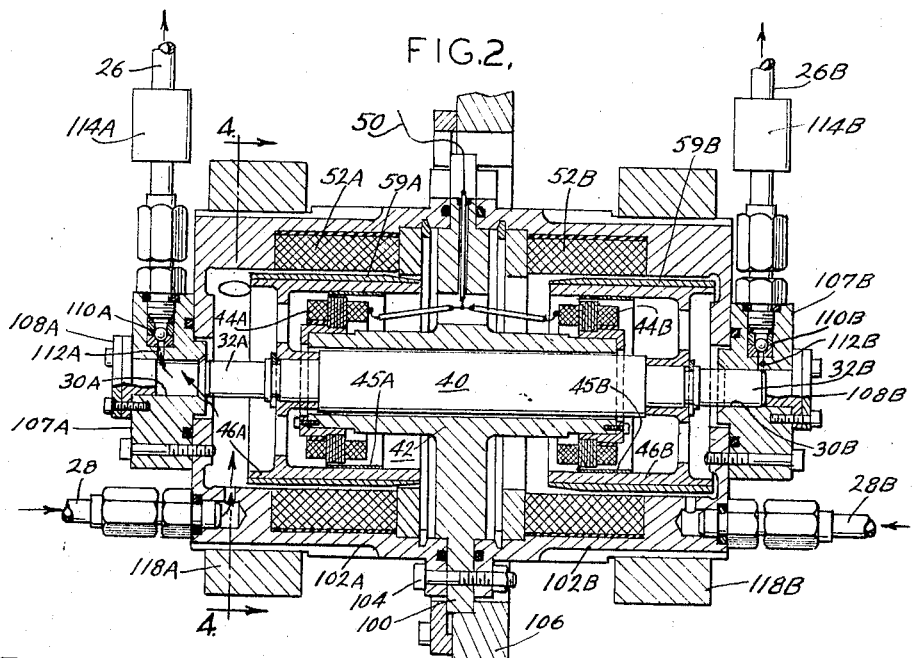
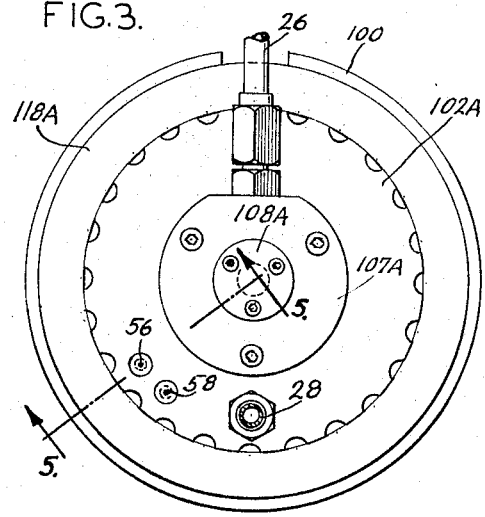
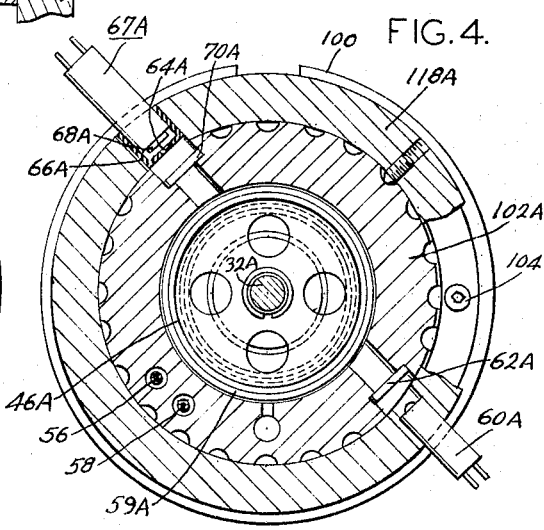
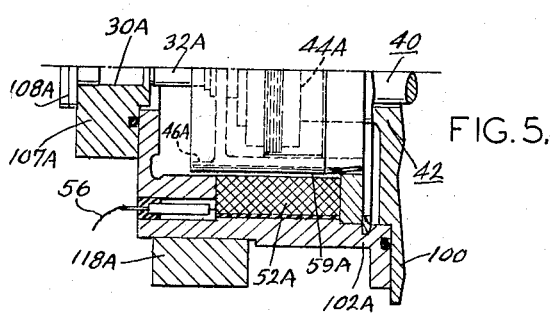
INVENTORS
WALTER L. SCHNEIDER
DOMINICK P. SCOTTO
BY Howson & Howson
ATTYS

3,285,075
GAS PUMP APPARATUS AND GYROSCOPE SYSTEM EMPLOYING SAME
Walter L. Schneider, Levittown, and Dominick P. Scotto, Plainview, N.Y., assignors to American Bosch Arma Corporation, Garden City, N.Y., a corporation of New York
Filed Feb. 28, 1964, Ser. No. 348,108
13 Claims. (Cl. 74—5)

This invention relates to gyroscope systems employing pressurized gas, and to fluid pump apparatus especially suitable for use therein.

It is known in the prior art to supply gas under pressure to a gyroscope, as described for example in copending application Serial No. 135,662 of Schneider et al., entitled, Fluid Bearing Gyroscopes, and filed September 1, 1961, wherein the pressurized gas is used to support the gyro element of the gyroscope. For the latter purpose it is important that the gas supplied to the gyroscope be uncontaminated by foreign matter such as may be produced by lubricants or wearing parts in conventional gas pump. For this reason the pressurized gas for such applications has typically been supplied to the gyroscope from a storage tank containing the gas in pure form under pressure.

Such an arrangement has a number of significant disadvantages. For example, if the gyroscope is to be run for a long period of time, large quantities of stored gas are needed, which is not only costly but also creates serious storage problems particularly in applications in which the gyroscope is to be used in a space vehicle or missile for example. Furthermore difficulties are normally encountered in supplying the gas from the storage chamber to the gyroscope, particularly when the gyroscope is mounted for relative motion with respect to the gas storage chamber, as is usually the case. In the latter case the need for a long run of gas piping to supply the gas from the storage chamber to the gyroscope, and the need to accommodate the above-mentioned relative motion despite the piping, create difficulties and constraints in the system design which are generally undesirable.

As set forth more fully hereinafter, we have found that these and other difficulties may be overcome by a gyroscope system which includes as one component thereof a new gas pump capable of varying the pressure of the gas without introducing contamination of the gas by the pump. This novel pump is also useful in a variety of other applications for applying pressures to fluids, and is especially advantageous where its main features of cleanliness and long operating life are of importance.

Accordingly, it is an object of our invention to provide a new and useful gyroscope system.

It is also an object to provide a gyroscope system which employs a gyro element supported by a gas substantially free of contaiminants such as might be produced by lubricants or wearing parts, and yet does not require a large reservoir of gas, or long or inconvenient gas connections between relatively movable elements.

Still another object is to provide a new and useful fluid pump for varying the pressure applied to a fluid, and which is particularly adapted for minimizing the contamination of the fluid by the pump.

A further object is to provide a new and useful gas pump which has a long operating life.

Another object is to provide such a pump which is compact.

Still another object is to provide new apparatus for applying pressure to a fluid, said apparatus being operated in response to electrical power and responsive to adjustment of said electrical power to regulate the pressure applied to said fluid.

In accordance with the invention these and other objects are achieved by the provision of a novel gyroscope system in which the gyroscope is supplied with gas under pressure from a gas compressor, the compressing element of which compressor is itself supported by gas and is actuated by means of fields, preferably magnetic fields. In the preferred form of the invention the gyroscope and the compressor therefor are mounted in fixed positions relative to each other on a common movable element such as a stabilized rotatable platform. The gas supply for the compressor may be the surrounding environment or a return line from the gyroscope to the compressor. Accordingly no special gas storage chamber is required, and long, awkward runs of piping between such a storage chamber and the movable platform supporting the gyroscope are eliminated. Nevertheless, gas of the necessary pure form is supplied to the gyroscope from the pump or compressor because the compressing element, being gas supported, does not require mechanical bearings and lubricants, and, having a field-actuated compressing element, does not require lubricants or wearing parts for reciprocating it.

The novel fluid pump of our invention, suitable for use as the above-mentioned gas compressor, comprises a hydrodynamic bearing having an inner and an outer member with a small fluid-filled space between them. Means are provided for effecting relative rotation between the inner and outer members at a rate sufficient to produce hydrodynamic-bearing action between them, in the manner of a self-acting bearing. Means are also provided for producing a reciprocative motion between said inner and outer members along the axis of their relative rotation, and this latter reciprocative motion is used to apply pressure to a fluid.

In a preferred form the outer bearing member is a stationary cylinder, and the inner member is part of a unit which is rotated by means of electric motor apparatus applying a magnetic field thereto and is reciprocated by solenoid means also applying a magnetic field thereto. This unit therefore serves as a hydrodynamic bearing element, as the armature of an electric motor, as the actuated plunger of a solenoid, and as the piston of a compressor. While it is possible to use as the rotating and reciprocating unit a simple cylindrical piston having a bearing portion within the cylinder, to apply both the rotating and reciprocating fields to the bearing portion of the piston, and to use an end of this piston as the compressing element, we have found it advantageous to use different portions of the unit for at least some of these different functions and to modify the shape and nature of these different portions to accommodate and optimize performance of their respective functions.

In particular, the rotating and reciprocating unit preferably extends exterior to said cylinder, and the fields for providing rotation and reciprocation are applied to said exterior parts thereof. In accordance with one feature of the invention this exterior part of the rotating and reciprocating unit includes a concentric portion extending back around the inner-bearing portion thereof and outside said cylinder, to which concentric portion said fields for providing said rotation and reciprocation are applied. More particularly, rotation of the inner member is preferably provided by using said exterior concentric portion thereof as the armature of a hysteresis motor, and reciprocation is preferably provided by using said exterior concentric portion as the plunger element of a solenoid.

In a preferred form of the invention pick-off means, such as photoelectric pick-off means, are provided to sense the relative reciprocative positions of the cylinder and the rotating and reciprocating unit and to develop control signals which control the actuation of the solenoid coils and thereby produce reversal of the direction of reciprocative motion at the appropriate times. One or more chambers for confining the fluid during application of pressure thereto may also be provided, together with appropriate valves such as are commonly used in pumping devices.

In accordance with a further feature, means are preferably provided for adjusting the electrical power supplied to the solenoid, thereby to regulate the pressure applied to the fluid by the pump.

These and other objects of the invention will be more fully appreciated from a consideration of the following detailed description, taken in connection with the accompanying drawings, in which:

FIGURE 1 is a schematic representation in perspective of a system in accordance with the invention in one aspect;

FIGURE 2 is a longitudinal sectional view of a pump in accordance with one preferred embodiment of the invention;

FIGURE 3 is an end view of the pump shown in FIGURE 2;

FIGURE 4 is a sectional view taken along the lines 4—4 of FIGURE 2;

FIGURE 5 is a fragmentary sectional view taken along the line 5—5 of FIGURE 3; and FIGURE 6 is a schematic diagram illustrating electrical connections for one preferred embodiment of the invention.

Referring now specifically to the preferred embodiments of the invention shown by way of example in the drawings, FIGURE 1 represents an inertial system including a base 10, which may be a fixed support or may be attached to a moving vehicle such as a rocket for example. A platform 12 is mounted on the base 10 by means of a gimbaling arrangement in this case comprising support arms 14 and 16 and associated bearings 18 and 20 respectively, which permit the platform to rotate with respect to the base about the axis AA.

On platform 12 is mounted a gyroscope system 22 which may be utilized for any of a variety of known purposes, for example to stabilize the platform 12 or to produce information for use in inertial guidance for example. It will be understood that in the interests of simple exposition the arrangement shown provides only for rotation about the single axis AA, while in many cases one or more additional pairs of supports or gimbals will be utilized to permit rotation of platform 12 about one or more additional axes. Various other elements of an inertial system may be located on the platform 12 in well-known manner.

In this example gyroscope system 22 preferably includes one or more gyroscopes of a type having a gas-supportable gyro element of the general class described in the above-cited copending application Serial No. 135,662, and is surrounded by a pressure-sealed enclosure. Mounted on the same platform 12 is a gas compressor 24 which in this example is shown as supplying gas under pressure to gyroscope system 22 by way of compressor outlet line 26 and withdrawing gas from gyroscope system 22 by way of return line 28; however, in other cases the gas compressor may take in ambient gas and supply it to the gyroscope system, whence it is vented to the exterior. In accordance with the invention, compressor 24 includes a compressing element which is gas-supported and field-actuated, so that the compressed gas is not exposed to contaminating lubricants or wearing parts and hence is supplied to gyroscope system 22 in substantially pure form.

Electric control circuits 29 for controlling the operation of the gas compressor are in this case also mounted on platform 12 and connected to the compressor by an electrical cable 29a, although at least a portion of the control circuits may be located on the base 10 or elsewhere if desired. Electrical power may be supplied to control circuits 29 by leads 29b.

Some of the basic advantages of the invention may be appreciated from the following considerations with reference to FIGURE 1. It will be appreciated that in most instances the platform 12 is made as small as possible, and is normally mounted by means of bearings which are made as delicate as is compatible with the weight which they are required to support. It is therefore highly undesirable, and in certain cases a practical impossibility, to mount on the platform 12 a large tank of pure gas such as might be used for supplying gyroscope system 22 with its necessary compressed gas supply. Previously-known types of compressors which might be mounted on platform 12 are highly undesirable and generally impracticable because of the introduction of contaminants thereby, due to the use of lubricants and wearing surfaces therein. The remaining alternative of utilizing a large tank of compressed gas mounted on the fixed base 10 or nearby would require the use of relatively long runs of piping from the tank to the gyroscope system 22, and means would have to be provided for accommodating the motion of the platform 12 and the gyroscope system 22 during rotation thereof with respect to the base 10 and hence with respect to the supply tank. The use in accordance with the invention of a gas compressor with a gas-supported, field-actuated compressing element, mounted on the platform 12 along with the gyroscope system, therefore overcomes these problems of prior-art arrangements and provides a pure pressurized gas to gyroscope system 22 without requiring awkward piping connections and without requiring large storage tanks.

A particular preferred form of the gas compressor 24 suitable for use in the system of FIGURE 1 and for any of a large variety of other applications in which the pressure of the gas is to be varied, is illustrated in detail in FIGURES 2–5.

FIGURE 2 shows the compressor outlet line 26 and the return line 28 of FIGURE 1, the compressor serving to take gas in through return line 28 and discharge it through outlet line 26, the path of gas through the pump being indicated by the path of the arrows in FIGURE 2. The particular pump arrangement shown in FIGURE 2 is double-ended, the left-hand half of the pump being a mirror image of the right-hand half of the pump. Accordingly, the pump also acts to take in gas from the line 28B and discharge it through the line 26B. It will be understood that either end of the pump may be utilized to provide circulation of gas through a gyroscope, or the lines 26 and 26B may be joined to each other, and the lines 28 and 28B also joined together, so that both ends of the pump cooperate to provide circulation of gas through the same gyroscope.

Because of the identity between the two halves of the pump, a detailed description of only the left-hand portion need be given, corresponding parts of the left- and right-hand halves being indicated by the same numeral but with a different letter suffix. Compression of the gas takes place in the gas compression chamber 30A, wherein it is compressed by the motion into the chamber of a compressing element 32A constituting the extreme left end of a piston 40. A new supply of gas is permitted to enter chamber 30A each time the compressing element 32A is withdrawn sufficiently to provide a passage for the gas into the chamber 30A. Compressing element 32A is in this case an integral part of the reciprocating and rotating piston 40 which is hydrodynamically mounted and is rotated by means of applied fields. The same sequences of gas compression and introduction of new gas occur at the right-hand end of the compressor in chamber 30B, but alternately with the corresponding actions in chamber 30A.

More particularly, compressing element 32A in this example comprises a reduced-diameter portion of a generally-cylindrical piston member 40 the larger diameter portion of which fits within cylinder 42, a small, uniform gap being provided between the piston 40 and the cylinder 42. A pair of hysteresis motor coils 44A and 44B, located outside and near opposite ends of cylinder 42 are supplied with electrical power by way of cable 50 to effect rapid rotation of piston 40 about its longitudinal axis, the rate of rotation being sufficient that the larger-diameter portion of piston 40 substantially centers itself hydrodynamically in the cylinder 42. For this purpose a pair of hysteresis rings 45A and 45B are provided around and concentric with motor coils 44A and 44B respectively; rings 45A and 45B are secured to the under surfaces of a pair of cylindrical shells 46A and 46B, respectively, which shells are concentric with, and secured to, piston 40 beyond the opposite ends of cylinder 42. Accordingly alternating current supplied to the motor coils 44A and 44B applies a varying magnetic field to the hysteresis rings 45A and 45B to rotate them, and with them piston 40, in the same manner that the armature of a conventional hysteresis motor is rotated. Sideways reciprocating motion of piston 40 during such rotation is effected by means of the pair of toroidal solenoid coils 52A and 52B, which are actuated alternately by means of current supplied thereto by wires, such as 56 and 58 (FIG. 3) in the case of coil 52A. In this preferred embodiment, the hysteresis motor coils 44A and 44B are located within the solenoid coils 52A and 52B and are concentric therewith. The solenoid coils exert solenoid-plunger action on a pair of corresponding rings 59A, 59B of magnetic material secured to the outer surfaces of cylindrical shells 46A and 46B respectively.

Accordingly it will be appreciated that cylinder 42 constitutes the outer member of a hydrodynamic bearing of which piston 40 is the inner member, and that the latter inner member is an integral part of a rotating and reciprocating unit which comprises also the compression elements 32A and 32B and the cylindrical shells 46A and 46B to which the motor-armature rings 45A, 45B and the solenoid-plunger rings 59A, 59B are secured. Preferably all mechanical parts of the pump are of non-magnetic material so as not to interfere with the action of the electric motor coils and the solenoid coils on their respective magnetic rings. To provide control of the alternate actuation of the two solenoid coils 52A and 52B, pick-off means, or position-sensing devices, are provided which sense and produce electrical indications each time the piston 40 moves laterally past either of a pair of predetermined positions near opposite extremes of its reciprocation cycle. In this example the pick-off means for the left half of the pump comprises a light source 60A of FIGURE 4, directed through a window 62A toward an aperture 64A in an opaque mask 66A, and toward a photocell arrangement 67A comprising a photosensitive element 68A in line with aperture 64A. A window 70A is also preferably provided for the photocell arrangement. Light from source 60A reaches photosensitive element 68A except when piston element 40 has advanced far enough to the left that cylindrical shell 46A, which is opaque, intervenes between light source 60A and photosensitive element 68A. The resultant change in conductivity of photosensitive element 6A is then used to control a switch for alternately connecting a source of electrical power to the two solenoid coils 52A and 52B, as illustrated in FIGURE 6. A similar photoelectric pick-off and control arrangement is located near the right-hand end of the compressor, and also acts to control the switch.

Referring particularly to FIGURE 6, light source 60A is provided with heating current for its lamp filament from an A.C. source 80, typically by way of a voltage step-down transformer 82. Photosensitive element 68A is connected in series with a battery 84A and the input terminals of a switch control circuit 86A. Switch control circuit 86A in turn is utilized to control the position of switch 88, illustrated in this example as a mechanical switch having a diametrally-extending rotating switch contact 89. In the position of contact 89 shown in full line in FIGURE 6, the battery 90 is connected across solenoid winding 52A, and in the contact position shown in dotted line the battery 90 is connected instead across solenoid 52B. Each time photosensitive element 68A is darkened by the arrival of the cylindrical shell 46A at a position near the extreme left-hand excrusion of piston 40, switch control circuit 86A responds to advance the switch contact 89 of switch 88 by 90° to the position in which voltage is applied across solenoid coil 52B and is removed from solenoid coil 52A. A similar photoelectric pick-off B, designated by the numeral 91, is located at the right side of the pump and operates by way of a switch control circuit 86B to advance switch contact 89 by 90° to the position in which voltage is removed from solenoid winding 52B and applied to solenoid winding 52A. Since each solenoid winding when supplied with current tends to move the piston 40 toward the end of the pump near which that solenoid winding is located, the above-described alternate application of current to the solenoid windings produces the desired reciprocation of the spinning piston 40 in cylinder 42.

It will be understood that switch control circuit 86A and switch 88 as shown indicate only schematically an arrangement for effecting the desired alternate actuation of the two solenoid windings; in practice these elements may comprise a stepping-relay arrangement actuated each time one of the photosensitive elements is darkened, or, particularly for high-speed pump operation, may instead comprise an electronic switch such as a multivibrator circuit arrangement, suitable forms of which will be apparent to one skilled in the art.

Also shown in FIGURE 6 is an arrangement for varying the voltage applied to the solenoid windings. It is an unusual characteristic of our pump that by so doing the pressure applied to the fluid in chambers 30A and 30B can be varied in a predetermined manner, the pressure being a direct function of the applied solenoid voltage. More particularly, in FIGURE 6 the negative terminal of battery 90 is connected to the solenoid windings 52A and 52B by way of single-pole double-throw switch 92. With the arm 93 of switch 92 in the position shown in full line, the full battery voltage is applied to the solenoid windings. However, with switch arm 93 in its broken-line position a lesser voltage of a magnitude determined by the position of slider 94 on resistor 95 is applied to the solenoid windings. In the arrangement shown the position of switch arm 93 is controlled by an acceleration sensor 96 which serves to connect the arm to slider 94 when the acceleration of the system is in a predetermined low range and to connect it to the top of resistor 95 when the acceleration is above said range. The position of slider 94 is manually variable by means of a control knob 97 mechanically linked thereto, which knob may be associated with a dial 98 calibrated in terms of pump pressure.

This pressure-regulating arrangement is esepcially useful in applications in which the pump is to supply gas to one or more gyroscopes subjected at different times to widely different accelerations, such as in a space vehicle which is subjected to high accelerations only during launch and special rapid maneuvers. When high accelerations are applied, a high gas pressure is required for the gyroscopes; at other times a low gas pressure is adequate. Accordingly, by automatically placing switch arm 93 in the position shown in full line in FIGURE 6 during high accelerations, and by automatically placing it in its broken-line position at other times, the electrical power supplied to the solenoid windings is minimized. Control knob 97 permits adjustment of the pressure deevloped in the low-acceleration condition as may be required in different applications.

Referring again to FIGURES 2 through 5, in the particular mechanical arrangement shown, cylinder 42 is mounted by a peripherally-extending flange 100 to the two substantially-identical halves 102A and 102B of a split cylindrical housing, by any convenient means such as a bolt 104, and the housing in turn may be rigidly connected by the mounting arrangement 106 to the fixed base 10 shown in FIGURE 1. The gas compression chamber 30A is formed by a cylindrical cap 107A secured to the housing and accurately aligned with the compressing element 32A, and by a closing plug 108A bolted to the cap. To provide one-way flow of gas from chamber 30A to outlet line 26, a ball valve ararngement 110A is located in the gas path between an aperture 112A in the wall of chamber 30A and the outlet line 26, arranged to open when the gas in chamber 30A is compressed and to close when the pressure is relieved in chamber 30A by a withdrawal stroke of compressing element 32A. A chamber 114A may be provided in series with line 26A to assist in smoothing out pressure peaks; a similar arrangement may be used at the right side of the pump. Appropriate mechanical means are provided for mounting the solenoid coils 52A and 52B to the housing segments 102A, 102B respectively, for mounting the hysteresis motor windings 44A and 44B on cylinder 42, and for sealing the pump from the ambient. The removable clamping ring 118A surrounding the housing provides apertures for receiving and mounting the light source 60A and the photocell arrangement 67A.

In operation, with the supply-line switch 120 of FIGURE 6 closed to supply electircal power from an A.C. source 121 to the hysteresis motors, the piston 40 accelerates to a high rotational speed for which it hydrodynamically supports and centers itself in cylinder 42. Piston 40 is then reciprocated laterally back and forth by means of the solenoid windings 52A and 52B, first one winding 52A being connected to the battery supply 90 to pull the piston to the left and then the other winding 52B being supplied with current to pull the piston back to the extreme right, and so on. The position of the photoelectric pick-off means is such that the compressing elements 32A and 32B move sufficiently into chambers 30A and 30B respectively to provide the desired compression of the gas therein, and then withdraw sufficiently to provide an opening between compressing element and chamber for gas to flow from the inlet lines into the two chambers at the extremes of the stroke. The opposite ends of piston 40 provide identical actions in opposite phases, so that compression is produced first in chamber 30A and then in chamber 30B.

Because there are no lubricants or wearing parts involved in the pump, the gas supplied by way of outlet lines 26 and 26B, maintains its purity. Also, because of the lack of wearing parts the life of the pump is very long. The arrangement and construction of the cylinders 46A and 46B also provide longitudinal compactness for the assembly, particularly adapting the pump for mounting on a platform such as platform 12 of FIGURE 1. If instead an in-line structure were employed in which the hysteresis motor coils and the solenoid coils were longitudinally spaced along the piston 40, a substantially greater length of the pump would result.

In one particular model of the pump described above, the cylinder 42 had a length-to-diameter ratio of about 5, and provided a gap between its walls and the outside of the piston 40 of about 50 to 80 microinches. The hysteresis motors were excited by 60 volt, 400 cycle power, and the solenoid coils consisting of 7500 turns of #34 wire were excited alternately with about 100 to 150 milliamperes D.C. The rings 59A and 59B on cylindrical shells 46A and 46B constituted the plungers for the two solenoid windings. The clearance between each of the compressing elements 32A and 32B and the walls of its associated gas compression chamber was between about 0.0002 and 0.0003 inch, and the piston stroke about one-half inch in length. The pump housing was hermetically sealed to allow closed circuit operation while supplying gas from the two outlet lines 26 and 26B to two different gyroscopes, the housing of the pump being hermetically sealed so as to act as a low-pressure gas storage tank.

Various other forms of apparatus in accordance with the invention will occur to one skilled in the art. For example, it is apparent that either or both of the chambers 30A and 30B may be replaced by a protruding piston, and the corresponding compressing element replaced by a cavity in the piston 40 into which the protruding piston would be driven to effect compression. Also the effect of chamber 30 may be obtained by merely extending the cylinder 42 and providing it with closed ends, so that the hydrodynamic mounting and compression action are obtained in a common cylinder.

Thus while the invention has been described with particular reference to certain specific preferred embodiments thereof it will be apparent that it is susceptible of a large variety of diverse forms without departing from the scope and spirit of the invention as defined by the appended claims.

We claim:
1. A gyroscope system, comprising:
   a supporting base member;
   a platform mounted on said base member and movable with respect to said base member;
   a gyroscope on said platform, said gyroscope having a rotatable gyro element operatively supportable by gas under pressure;
   a gas compressor supported on said plaform for producing pressurized gas substantially free of contaminants by said compressor; and
   means for supplying said pressurized gas to said gyroscope to support said gyro element;
   said gas compressor comprising a cylinder, a piston element in said cylinder, electric motor means for rotating said piston element in said cylinder and about the axis of said cylinder to provide hydrodynamic mounting of said piston element, and solenoid means for reciprocating said piston element in said cylinder during said rotation thereof for pressurizing gas in said cylinder.

2. The gyroscope system of claim 1, comprising means for detecting the reciprocative position of said piston element and for controlling the operation of said solenoid means in accordance therewith.

3. The gyroscope system of claim 1, in which said piston element comprises a central cylindrical portion hydrodynamically journalled in said cylinder and another portion at least partially encircling said central cylindrical portion and concentric therewith, said motor means comprising first magnetic-field producing means for acting upon said other piston portion to effect said rotation and said solenoid means comprising second magnetic-field producing means for acting upon said other portion to effect said reciprocation.

4. A gas pump comprising:
   piston means;
   cylinder means surrounding at least a portion of said piston means and providing a gap between said portion of said piston means and said cylinder means;
   means for developing a first field and for applying it to effect relative rotation between said piston means and said cylinder means at a rate sufficiently high to produce hydrodynamic bearing between said piston means and said cylinder means;
   means for developing a second field and for applying it to produce reciprocative motion between said piston means and said cylinder means; and
   mean for varying the pressure of a gas in said cylinder means in response to said reciprocative motion.

5. The gas pump of claim 4 in which at least one of said piston means and said cylinder means is at least in part of magnetic material, in which said means for developing and applying a first field comprises electric motor means for developing a magnetic field and for applying it to a magnetic part of said one of said piston means and said cylinder means, and in which said means for developing and applying a second field comprises solenoid means for developing a varying magnetic field and for applying it to said magnetic part of said one of said piston means and said cylinder means.

6. The gas pump of claim 5, comprising position-sensing means for producing signals indicative of the attainment of a predetermined reciprocative position of said piston means with respect to said cylinder means, and means for applying said signals to said solenoid means to control said varying magnetic field produced thereby and hence said reciprocative motion.

7. The gas pump of claim 6, in which said position-sensing means comprises a source of radiation and a detector sensitive to said radiation, said source and said detector being positioned so that said reciprocative motion causes variation of the amount of said radiation reaching said detector.

8. A gas pump comprising:
a cylinder;
an armature-piston unit having a bearing portion disposed at least partially within said cylinder, said bearing portion being sufficiently small to provide a gap between it and the interior walls of said cylinder;
motor means for applying a magnetic field to said armature-piston unit to rotate said armature-piston unit in said cylinder at a rate sufficient to provide hydrodynamic bearing for said bearing portion in said cylinder;
solenoid means disposed along said cylinder and actuatable to apply a magnetic field to said armature-piston unit to reciprocate it in said cylinder during said rotation thereof;
position-sensing pick-off means responsive to changes in position of said armature-piston unit and connected to said solenoid means for producing control signals to control actuation of said solenoid means;
a gas-confining compression chamber; and
a compressing element connected to said armature-piston unit for compressing gas in said chamber in response to one direction of reciprocative motion of said armature-piston unit.

9. A gas pump in accordance with claim 8, comprising gas valve means communicating with said chamber for permitting flow of said gas through said valve during compression of said gas by said compressing element and for preventing said flow at other times.

10. A gas pump in accordance with claim 8, in which said armature-piston unit comprises a central portion in said cylinder and a radially-spaced cylindrical shell portion surrounding a part of said cylinder, in which said motor means comprises at least one coil between said central portion and said cylindrical shell portion of said armature-piston unit, and in which said solenoid means comprises at least one winding surrounding said cylindrical shell portion of said armature-piston unit.

11. A fluid pump, comprising:
cylinder means;
a rotating and reciprocating unit having a bearing portion hydrodynamically journalled in said cylinder means;
means for applying a varying magnetic field to said unit to effect rotation thereof at a rate sufficient to produce said hydrodynamic journalling;
solenoid means for applying a magnetic field to said unit to effect said reciprocation thereof;
means for applying pressure to a fluid in response to said reciprocation of said unit;
said solenoid means being responsive to changes in the magnitude of electrical voltage applied thereto to vary said pressure; and
means for changing said voltage to vary said pressure;

12. The pump of claim 11, in which said means for changing said voltage comprises a manual control device.

13. The pump of claim 11, comprising a frame for supporting said rotating and reciprocating unit and in which said means for changing said voltage comprises an acceleration sensor for automatically changing said voltage in response to changes in acceleration of said frame.

References Cited by the Examiner
UNITED STATES PATENTS

| | | | |
|---|---|---|---|
| 2,067,819 | 1/1937 | Bell | 230—55 |
| 2,940,318 | 1/1960 | Adams et al. | 74—5 |
| 3,121,179 | 2/1964 | Macks | 308—9 X |
| 3,156,405 | 11/1964 | Curwen | 230—55 |

MILTON KAUFMAN, *Primary Examiner.*